Patented Aug. 23, 1938

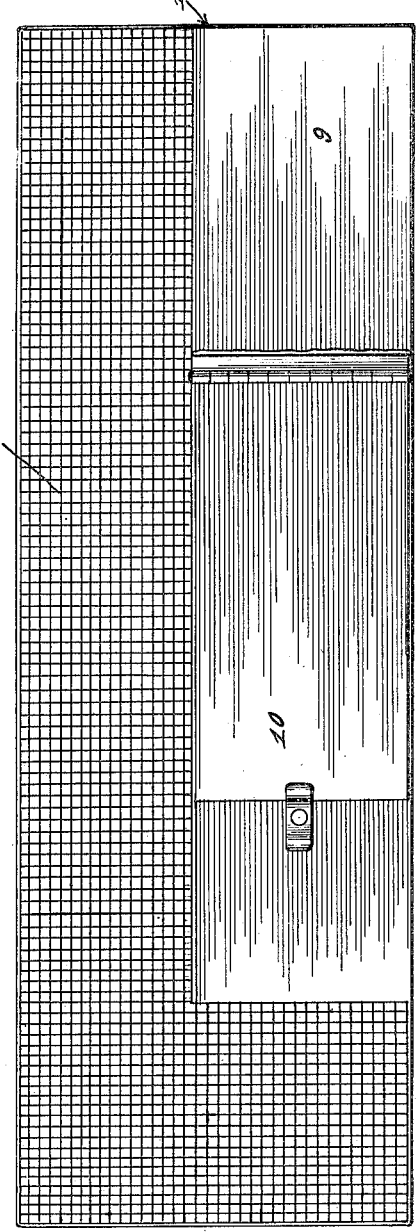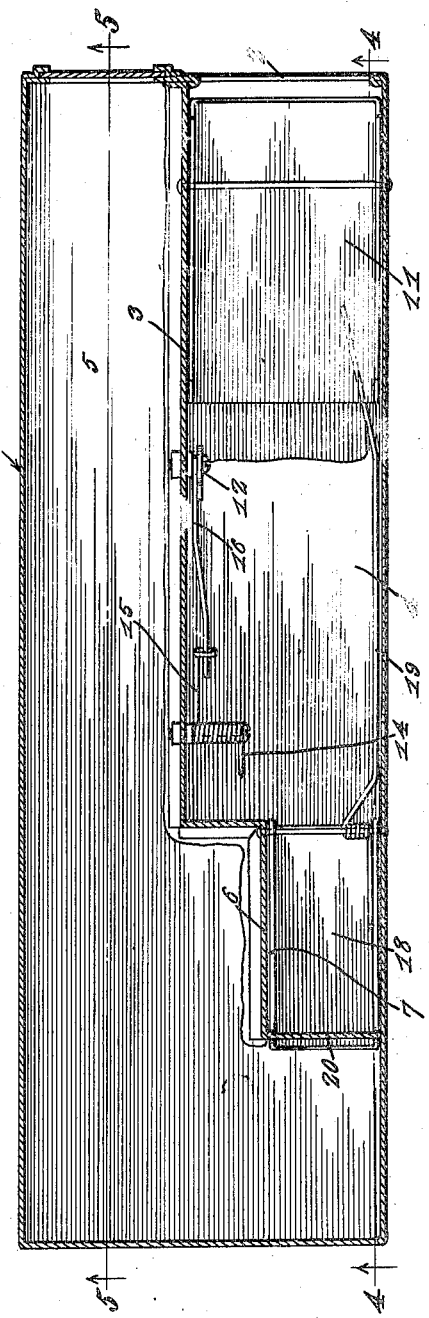

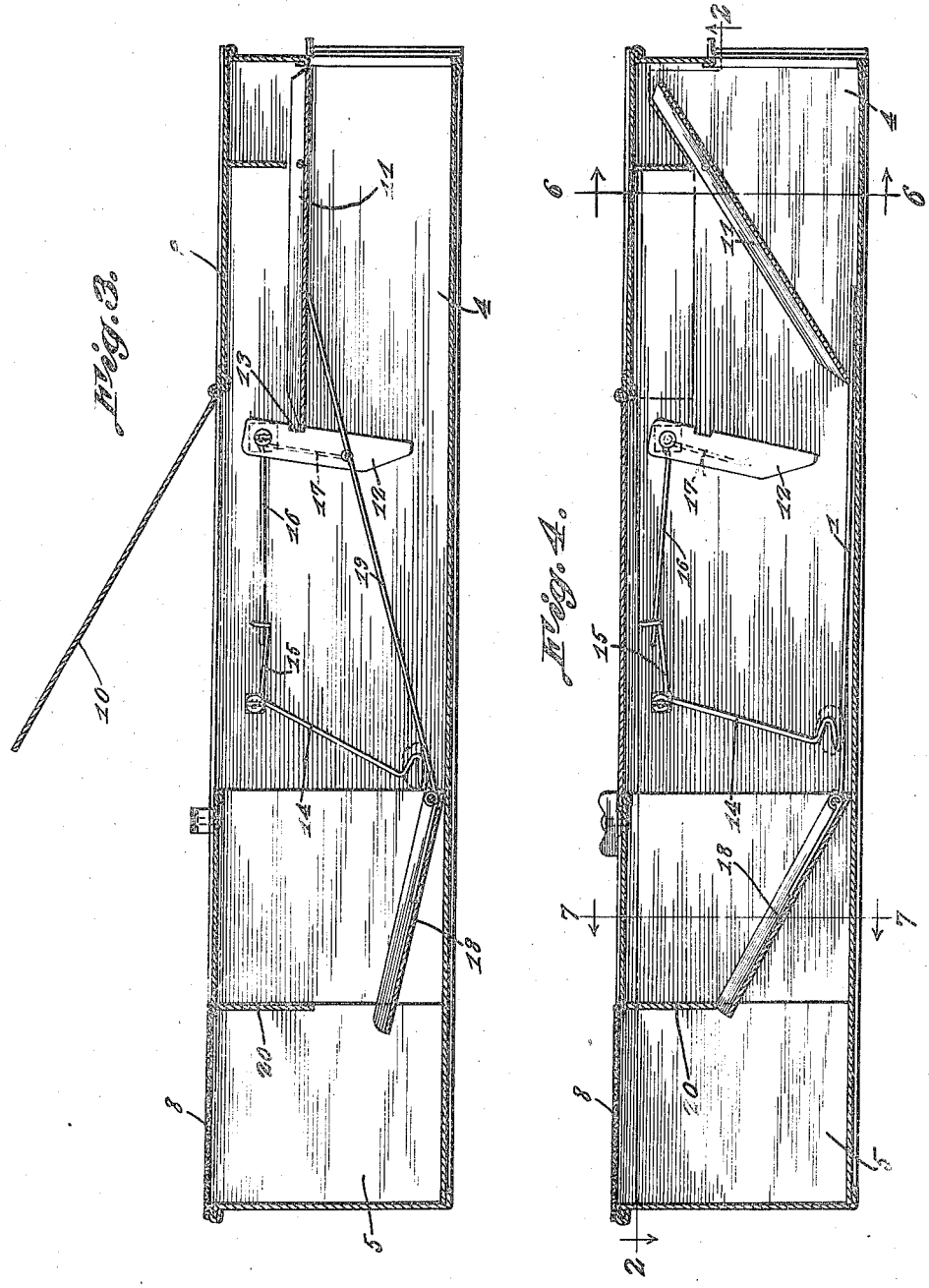

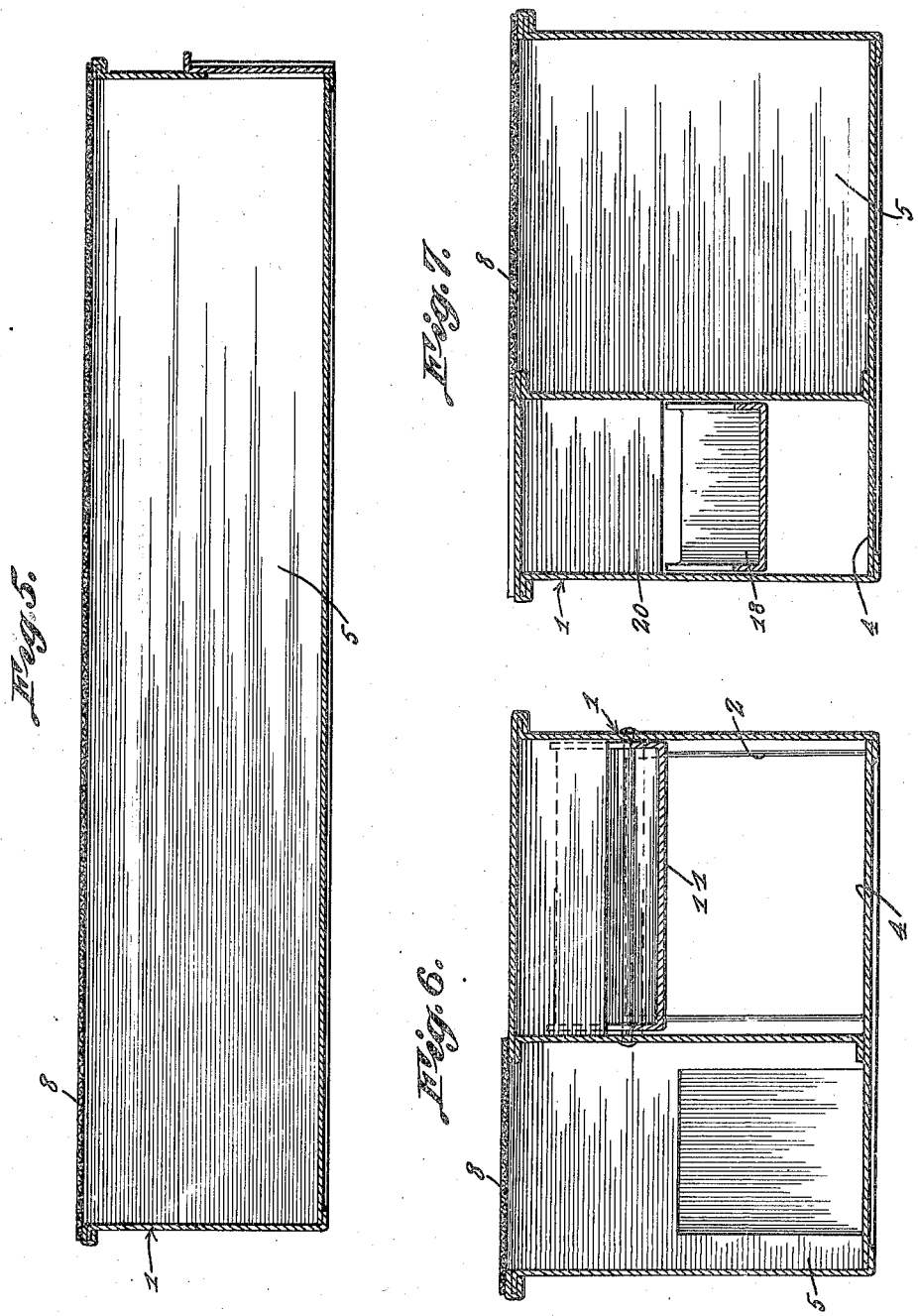

2,128,143

UNITED STATES PATENT OFFICE 2,128,143

AUTOMATIC RAT TRAP

Ernest L. Harrison, Portsmouth, Ohio

Application July 29, 1937, Serial No. 156,393

1 Claim. (Cl. 43—76)

This invention relates to traps for catching rodents and other animals and has for the primary object, the provision of a device of the above stated character which will be set by the trapping of an animal therein so that another animal may enter and become trapped and is so constructed that the animal trapped will be prevented from again entering the bait compartment, and also a person may conveniently bait the trap without disturbing the trapped animal or animals.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a trap constructed in accordance with my invention.

Figure 2 is a horizontal sectional view taken on the line 2—2 of Figure 4.

Figure 3 is a vertical sectional view illustrating the means for trapping an animal arranged in a set position.

Figure 4 is a sectional view taken on the line 4—4 of Figure 2 showing the means for trapping the animal in a released position.

Figure 5 is a sectional view taken on the line 5—5 of Figure 2.

Figure 6 is a transverse sectional view taken on the line 6—6 of Figure 4.

Figure 7 is a similar view taken on the line 7—7 of Figure 4.

Referring in detail to the drawings, the numeral 1 indicates an elongated casing having arranged in one of its end walls an entrance 2 through which animals may enter. A partition 3 is located in the casing to divide the latter into a runway 4 and an impounding compartment 5. The partition 3 is offset, as shown at 6, to form a passageway 7 and which is located between one end of the runway 4 and the compartment 5. A portion of the top of the casing is closed by foraminous material 8 to admit light to the impounding compartment while the other portion of the top of the casing is closed with solid material 9 provided with a doorway normally closed by a hinged door 10.

A door or gate 11 of the gravity actuated type is pivotally mounted in the runway 4 adjacent the entrance 2 and when in a position, as shown in Figure 4, will close the entrance to prevent escape of an animal from the runway after entering the latter. A trigger 12 is pivotally mounted in the runway and is provided with a notch 13 to receive the free end of the gate for supporting the latter horizontally, as shown in Figure 3, so that an animal may readily pass into the runway from the entrance 2. A bait hook 14 is pivoted in the runway 4 and carries an arm 15 pivotally and slidably connected to a trip rod 16 secured to the trigger and provided with an extension 17 extending parallel with the trigger. An animal attempting to remove the bait from the hook 14, will through the arm 15 and rod 16 rock the trigger 12, freeing the door so that the latter may gravitate into a position to close the entrance 2.

A pivotally mounted platform 18 is located in the passageway 7 and has connected to the pivoted end thereof an angularly disposed resetting bar or member 19 extending beyond the trigger 12 and under the gate 11. The weight of the member 19 normally supports the platform 18 in an inclined position and with the free end of the platform in engagement with a depending partition 20. The platform is flanged and when in engagement with the partition 20 will be supported slightly from the latter to admit light to the passageway. An animal trapped in the runway 4 endeavoring to escape therefrom and being attracted by the light between the platform 18 and partition 20 will tread upon the platform, causing the lowering thereof permitting the animal to pass into the impounding compartment 5. The weight of the animal upon the platform elevates the free end of the member 19, causing the gate 11 to swing upwardly and again engage the notch 13 of the trigger 12 consequently resetting the trap. The animal on leaving the platform 18, the member 19 gravitates to engagement with the bottom of the runway and elevates the platform to prevent the return of the animal from the impounding compartment to the runway 4.

While I have shown and described the preferred embodiment of my invention, it will be understood that minor changes in construction, combination and arrangements of parts may be made without departing from the spirit and scope of my invention, as claimed.

Having described the invention, I claim:

A trap comprising a casing having an entrance, a partition in said casing forming an impounding compartment and a runway communicative with said compartment by a passageway, said runway being in communication with the entrance, a gravity actuated gate closing the entrance to the runway, a pivoted trigger in the runway to support the gate in an elevated position to permit an animal from the entrance to pass into the runway, a bait hook pivoted in the runway and connected to the trigger for releasing the latter from the gate when tampered with by an animal, a platform pivoted in the passageway, and a member secured to the pivoted platform and normally supporting the latter in a position to close the passageway to the compartment and adapted by the movement of the platform under the weight of an animal to elevate the gate and position the latter in engagement with the trigger.

ERNEST L. HARRISON.